great utility for mounting

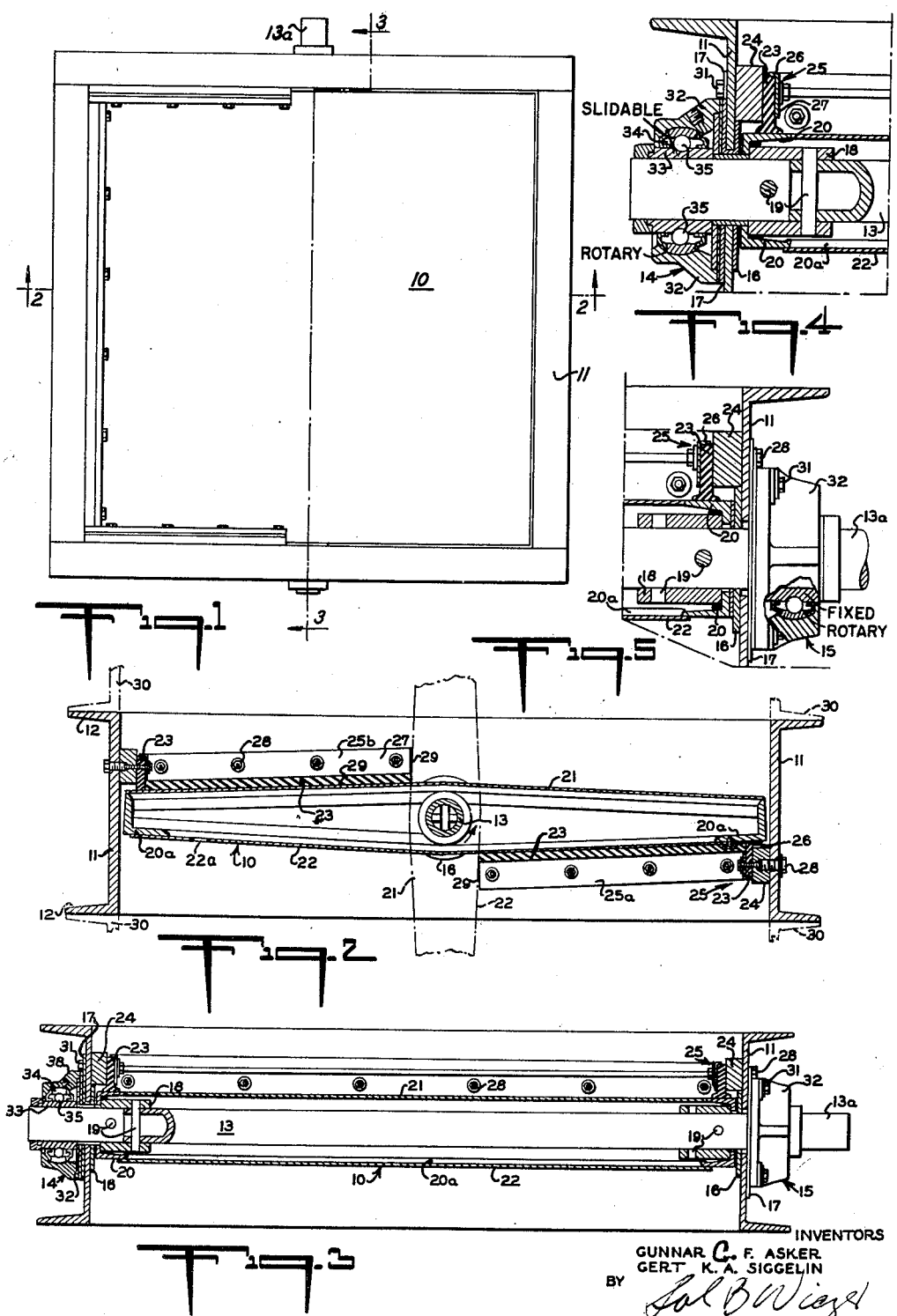

United States Patent Office 2,946,554
Patented July 26, 1960

2,946,554
BUTTERFLY VALVE

Gunnar C. F. Asker and Gert K. A. Siggelin, Falls Church, Va., assignors to Desomatic Products, Inc., Falls Church, Va., a corporation of Delaware Filed June 13, 1956, Ser. No. 591,069

2 Claims. (Cl. 251—306)

This invention relates to a butterfly valve for large volume control of fluid flow, usually air or other gas, and in particular to such valve flexibly constructed for expansive type seal over a wide variation in temperature. For this purpose the valve is constructed for seal of rotor vane edges against its surrounding casing by having mounted and supported between casing and rotor a heat flowable type of silicone rubber gasketing or sealing material. Such sealing material provides a rubbery solid sealing substance at normal and average temperatures but which flow slightly at higher temperatures to conform to the mating edges of a butterfly vane type rotor with the surrounding casing. Thus the silicone rubber sealing material provides improved sealing of the rotor against the valve casing, both at ordinary and low temperatures, as well as highly raised temperatures such as to 350 to 400° F.

The valve is further constructed to provide maximum flexibility during expansion and contraction over a relatively wide temperature range from low subnormal temperatures to relatively high temperatures of the range stated. Furthermore, and for this purpose, the valve is preferably constructed with bearings not only of wide or maximum play of about .0002 to .001 inch more or less to accommodate great expansion and contraction over such wide temperature range, but also the bearing races are desirably mounted for radial shaft support within their housings displaceable from a true coaxial support of the rotor shaft with any tendency of the shaft to be deflected by heat or cooling from its linearly aligned rotary shaft position. Finally, the bearing races at one end of the rotor shaft are axially slidable on the shaft to accommodate expansion of the rotor vane shaft.

Such valve has particularly great utility for mounting in an air duct in which air conducted in very large volume is conditioned, such as by drying the air by passing the same through a bed of moisture absorbent material such as silica gel and where the same valve in the same duct may also be used in a cycle of such air dehumidification wherein the dehumidifying bed is regenerated by periodically heating the bed to extremely high temperatures of the order of 350 to 400° F. to evolve hot moisture laden gases. With such alternating conditions over a wide range of temperature, great difficulty of control and sealing of gas passage is experienced with prior valve constructions in sealing of a rotor of the butterfly type to its valve seat and great distortion and binding of the rotor shaft of such large valve often takes place in the bearings.

The valve of this invention is further described in the drawings wherein:

Fig. 1 is a plan view of the valve in closed position mounted in a rectangular gas duct, Fig. 2 is a section through the valve taken on the lines 2—2 of Fig. 1, in elevation, Fig. 3 is a section through the center of the valve taken on the line 3—3 of Fig. 1, in elevation, Fig. 4 is an enlarged view of the left end portion of Fig. 3, Fig. 5 is an enlarged view of the right end portion of Fig. 3.

As shown on the drawings, the valve comprises a rotor vane 10, which may be of any shape, but for large volume gas flow ducting and corresponding valve control, the rectangular structure is more economical. However, the problem of sealing rectangular structure is more acute. The valve structure shown in the drawings is for rectangular ducts and the rotor vane is correspondingly rectangular. The valve casing may be the gas duct itself, but is preferably formed by joining the ends of four channel iron sections 11 into a rectangular frame which may be assembled with the rotor vane 10 as an integral duct 30 (as shown in dotted lines, Fig. 2) by bolting or welding through the flanges 12, of each channel 11 comprising the valve casing.

The rotor 10 is supported for rotation upon a shaft 13, which, for reduced weight, may be hollow or tubular shafting and extends through suitable seals through two opposite parallel channels 11 for support at each end in bearings 14 and 15. The shaft 13, further extends beyond the bearing 15, on an extension 13a on which a hand wheel, pulley wheel, gear etc. may be mounted for manual or mechanical rotation. Such mechanical rotation of the rotor in large air drier construction may be made automatic for synchronizing with some particular air drying or desiccant regeneration cycle.

The end portions of the shaft 13 within the rectangular channel iron casing are sealed to each opposite channel member 11 with heat resistant gaskets 16, which preferably are of molded asbestos composition, and similar gaskets 17 are placed on the outer sides of these channels upon the shaft 13 and to which bearing casings 14 and 15 are mounted to the channel iron webs 11 for further sealing to the outside of the casing. The shaft 13, within the channel iron framework, further carries surrounding sleeves 18, bolted at each end by bolts 19, near each channel iron web but separated therefrom. The sleeves 18 each have rigidly fastened thereto as by welding, two angle irons 20. A pair of cross angle irons 20a parallel to each other and to shaft 13 are fastened at the ends of angles 20 to form a rectangular rotor framework which is closed by upper 21, and lower 22 plates as a sheathing comprising the exposed surfaces of the rotor 10. The sheathing 21 and 22 is fastened to sides or edges of flanges of the angle irons 20 and 20a in any suitable manner as by bolting or welding to prevent gas seepage through the rotor 10, other than minor venting such as by the perforation 22a of Fig. II to avoid development of pressure within the rotor.

Secured to the inner vertical webs of channels 11, running perimetrically substantially entirely around the inner rectangular casing surface, is a silicone rubber sealing member 23. The silicone sealing member 23 is mounted inward of the web 11, and spaced therefrom by a rectangular bar 24, which serves both to support the sealing member 23, and space the same inward from the inner channel 11 web. Small channels 25, are mounted on the inner side of the silicone rubber seal 23. The channels 25 each have a small flange 26 (Figs. 4 and 5), which underlies about ½ to ⅞ usually about ⅔ of the thickness of the silicone rubber sealing element to provide horizontal end support for most of its body, but does not quite underlie the entire thickness thereof in order to allow for lateral compression of the resilient silicone rubber sealing material by the vertical flange. A vertical flange 27, of each angle 25, bears against and vertically supports about a similar large fraction, such as about ⅔ of the height of the silicone rubber seal. The vertical flange 27, grips the seal to about the same height as the spacing bar 24, leaving a substantial amount of the sealing element 23 exposed for resilient sealing contact with the rotor surface near the edge. The silicone rubber seal therefore, is supported between the bars 24, and angles 25, both of which are secured to the web of the channel 11, by bolts 28 passing entirely through the bar 24, the silicone seal 23, and the vertical web 27, of the channel 25, whereby the seal 23 is supported inwardly of the webs of channels 11.

The angles 25a in the right hand portion of the valve, as shown in Fig. 2, are mounted below the center of channels 11 to contact the lower surface edges of the rotor 10, for which purpose, the angles 25a are mounted at the proper vertical position beneath the lower plate 22, so that in horizontal or closed position of the rotor 10, the resilient silicone rubber seal will be in resilient sealing contact with the lower plate 22 through about ½ of the perimeter of the rotor. The opposite left hand half of the seal 23 has angle 25b oppositely mounted with the silicone rubber sealing element supported to depend downward for contact with the upper plate surface 21 of the rotor edge, extending around about ½ of the perimeter of the left hand side of the rectangular casing. Thus, in closed horizontal position of the rotor 10, gas passage through the rectangular casing formed by channels 11, is sealed by pressure of the lower plate 22 against the silicone seal 23 extending upward from angles 25a in the right hand side; and by the silicone seal 23, supported from angles 25a to depend downward against which upper plate 21, presses for seal of the left hand side.

As the rectangular mounted sealing elements 23 approach the plates 21 and 22 adjacent to the center or axis of the rotor from both left and right hand sides, they terminate and further sealing of the rotor 10 against the opposite end casing walls, comprising the vertical web portions of the channels 11, is effected by the resilient gaskets 16. Thus, the ends 29, of each flange 25a and 25b, as they approach the axis of the rotor terminate to remain separated a sufficient distance to accommodate the width of the rotor, between plates 21 and 22, so that each angle end 29 acts as to stop against both plate surfaces 21 and 22 in open dotted line, vertical position as shown in Fig. 2. These ends 29 tend to act not only as stops, but somewhat to brace the rotor against vibration or flutter in the open (dotted line) position with substantially high gas velocity moving over its surface in open port position.

For this purpose also, and as shown in Fig. 2, the top and bottom plates 21 and 22 and their angle iron supports 20 and 20a, may be slightly curved convexly, from the outer rotor edges towards the central axis to provide some curved stream-lining toward the center of the rotor vane 10 which also contributes towards the balance of the rotor and further reduces, in streamlined flow of gas against its surface, any tendency of the rotor vane to flutter.

While as shown in the drawings, the silicone rubber sealing material 23 at its sealing point of contact with the rotor vane edges is rectangular, at high temperatures the silicone rubber, over long periods of use with sealing compressive force bearing thereon, will flow slightly. For this particular material this is a substantial advantage because that flow tends to displace some of the silicone rubber into a broader sealing surface and thereby to provide a better gastight seal to conform to surface irregularities. Moreover, this type of rubber has great advantage in that it does not become tacky at high temperatures, whereby the silicone rubber does not tend to adhere to the rotor, upon subsequent cooling, i.e., the rotor does not tend to bind or stick to the seal. Finally, this type of sealing material has the advantage that it does not substantially lose its resilient sealing effect at raised temperatures.

While, of course, this type of seal may be used on other valve port constructions, it finds outstanding advantage in use with a valve of this construction and service wherein great difficulty is encountered in sealing a valve rotor of the butterfly type, particularly in large rectangular duct work where irregularities in construction is often present and where large variation of temperature in the gas causes expansions difficult to seal, but which must be accommodated by the seal.

The present valve moreover, has certain other features which particularly adapt the valve to this service, as subject to large temperature variation to avoid great strains of resulting expansion and contraction.

As briefly noted above, shaft 13 is mounted through bores in about the centers of parallel opposite side webs of channels 11 with substantial clearance therein, and is supported at each opposite end extending through the webs, outside of each opposite channel, by anti-friction ball or roller bearings 14 and 15. Each of said bearings has a bearing housing 32, bolted by bolts 31, through an extending flange of each housing 30 to said web through a gas tight resilient gasket 17, preferably of asbestos.

The shaft 13 at its left hand end has a bearing race 33, tightly secured thereabout as by shrink fitting, but the right hand corresponding bearing race in bearing 15 (not shown), is slidably fitted so that the shaft 13, may longitudinally expand slidingly therein without strain at the bearing races. Moreover, in order to overcome any strain on the bearings by heat distortion of the shaft 13 out of true axial alignment between bearings, an outer bearing race 34, separated from race 33 by ball bearing elements 35, is mounted in the housing 32, in universal ball-and-cup sliding rotary securement thereagainst. For this purpose the upper surface of the bearing race 34, contiguous with the housing 32, is spherically curved, and a corresponding race within bearing 15 (not shown) may likewise be mounted for universal movement by spherically shaping at its point of securement against housing 32 of bearing 15. With that type of bearing construction the rotor vane 10, supported for rotation upon shaft 13, has optimum flexibility to accommodate any strains upon the bearings by distortion from true axial alignment with heat expansion or contraction.

Moreover, it will be apparent with the type of resilient seal mounted around the perimetric edges of the large rotor vane, particularly as provided by a pressure deformable and heat flowable rubber, as the preferred silicone rubber sealing material hereof, which is adapted to accommodate its sealing surface lines to substantial variation in accurate linear continuity of the edge of the rotor to give continuous sealing contact despite irregularities, even greater flexibility may be built into such bearings to further reduce rotary and temperature change developed strains. For that purpose, unusually large tolerances may be built into the bearing elements. For instance, clearances of at least .0002 and substantially higher, such as up to .001, may be provided for uptimum safety to prevent binding strains in the bearings.

As thus described, a butterfly valve is provided having optimum utility for large volume gas control, even as shown for volumes most economically handled in rectangular ducts; and for servicing such gas flow under conditions where wide variations in temperature resulting in great expansion and contraction of large metal parts with consequent development of strains which the present design overcomes. Such effective construction in a butterfly valve is made available by use of pressure deformable and heat flowable silicone rubber sealing material mounted for contact with the perimetric edges of the rotor, flowing to optimum sealing contact with heat and pressure, whereby substantial construction irregularities will be accommodated while providing effective seal. Highly flexible strain accommodating bearings are preferably used with that construction in as much as by great flexibility of the sealing element substantially greater bearing tolerance and flexibility in bearing mountings becomes available.

Certain modifications will occur to those skilled in the art and it is accordingly intended that the description herein given by any of the examples be regarded as illustrative and not limiting except as defined in the claims appended hereto.

We claim:
1. A butterfly valve comprising a casing and a vane symmetrically supported in said casing for gas flow control by rotation on a rotor shaft, said rotor shaft being supported at its opposite ends for rotation in said casing in anti-friction bearing supports, one of said bearings having its inner bearing race surrounding said shaft in a sliding fit thereon to accommodate expansion and contraction by temperature changes, both of said bearing supports further having bearing races secured in opposite casing portions therein for universal rotation, whereby radial deforming forces upon said rotor shaft tending to bow the same out of direct axial alignment between bearings is accommodated without strain upon said supports.

2. A large volume gas control butterfly valve for control of gas flowing through rectangular ducts subject to substantial variation in temperature, comprising a rectangular casing having a rotary vane symmetrically mounted for rotation within said casing, said vane comprising rectangular upper and lower sheathing elements each vertically disposed from the other and fastened to an opposite tangential point of a central rotor shaft, said sheathing elements being perimetrically fastened at their edges to a rectangular stiffening frame, thus cubically enclosing a heat insulating air space therebetween, one of said sheathing elements including venting means, the assembled vane being symmetrically balanced about said rotor shaft, silicone rubber sealing means mounted perimetrically about said casing in separated portions, each portion supported by an angle iron housing terminating near the rotary vane axis of rotation at points defined by the upper and lower surfaces of said rotor vane in gas flow control rotation from horizontal to vertical positions, one portion of said sealing element being mounted above with its silicone rubber sealing member extending deformably from said angle iron housing a substantial distance downward for sealing contact with the upper surface portion of said rotor vane on one side of the axis of rotation thereof, and another portion of the sealing element mounted below with its silicone rubber sealing member extending deformably from said angle iron housing a substantial distance upward for simultaneous sealing contact with the lower surface portion of said rotor vane on the opposite side of the axis of rotation thereof in the valve closed position, said rotor shaft and the central rotor vane portion being sealed against the inner wall of said casing defining said flow path by annular resilient gaskets.

References Cited in the file of this patent
UNITED STATES PATENTS

| | | |
|---|---|---|
| 1,156,188 | Sorensen | Oct. 12, 1915 |
| 1,858,587 | Grant | May 17, 1932 |

FOREIGN PATENTS

| | | |
|---|---|---|
| 66,582 | Sweden | of 1926 |
| 631,957 | Great Britain | of 1949 |

OTHER REFERENCES

"Product Engineering," vol. 18, No. 2, February 1947, pp. 146–150 (TJ–1–.P93), published by McGraw-Hill Publishing Co. (Copy in Scientific Library.)